United States Patent
Zhang et al.

(10) Patent No.: US 9,781,706 B2
(45) Date of Patent: *Oct. 3, 2017

(54) SENDING AND REDUCING UPLINK FEEDBACK SIGNALING FOR WIRELESS TRANSMISSION OF DATA

(71) Applicant: INTERDIGITAL TECHNOLOGY CORPORATION, Wilmington, DE (US)

(72) Inventors: Guodong Zhang, Syosset, NY (US); Christopher R. Cave, Montreal (CA); Guang Lu, Thornhill (CA); Paul Marinier, Brossard (CA); Arty Chandra, Manhasset Hills, NY (US); Sudheer A. Grandhi, Pleasanton, CA (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 79 days.

This patent is subject to a terminal disclaimer.

(21) Appl. No.: 14/692,130

(22) Filed: Apr. 21, 2015

(65) Prior Publication Data

US 2015/0230228 A1 Aug. 13, 2015

Related U.S. Application Data

(63) Continuation of application No. 13/758,758, filed on Feb. 4, 2013, now abandoned, which is a continuation
(Continued)

(51) Int. Cl.
*H04W 72/00* (2009.01)
*H04W 72/04* (2009.01)
(Continued)

(52) U.S. Cl.
CPC ....... *H04W 72/0406* (2013.01); *H04L 1/0015* (2013.01); *H04L 1/0026* (2013.01);
(Continued)

(58) Field of Classification Search
CPC ............ H04W 72/005; H04W 74/0866; H04L 1/1607; H04L 1/0015; H04L 1/1861;
(Continued)

(56) References Cited

U.S. PATENT DOCUMENTS 6,169,759 B1 1/2001 Kanterakis et al.
6,567,482 B1 5/2003 Popovic
(Continued)

FOREIGN PATENT DOCUMENTS

EP 1 427 128 6/2004
EP 1 460 791 9/2004
(Continued)

OTHER PUBLICATIONS

3GPP TR 25.814 V7.0.0 (Jun. 2006): 3rd Generation Partnership Project; Technical Specification Group Radio Access Network; Physical layer aspects for evolved Universal Terrestrial Radio Access (UTRA) (Release 7).*
(Continued)

*Primary Examiner* — Ronald Eisner
(74) *Attorney, Agent, or Firm* — Volpe and Koenig, P.C.

(57) ABSTRACT

A wireless transmit/receive unit includes at least one processor that receives a high speed physical downlink shared channel, and in response, transmits at least one random access channel preamble followed by ACK/NACK and channel quality indicator (CQI) information. The at least one random access channel preamble is selected from a set of random access preambles reserved for the ACK/NACK and CQI information.

14 Claims, 3 Drawing Sheets

Related U.S. Application Data of application No. 11/840,755, filed on Aug. 17, 2007, now Pat. No. 8,369,860.

(60) Provisional application No. 60/838,670, filed on Aug. 18, 2006, provisional application No. 60/841,665, filed on Aug. 31, 2006.

(51) Int. Cl.
  *H04L 1/00* (2006.01)
  *H04L 1/16* (2006.01)
  *H04L 1/18* (2006.01)
  *H04L 12/18* (2006.01)
  *H04W 74/08* (2009.01)

(52) U.S. Cl.
  CPC .......... *H04L 1/0029* (2013.01); *H04L 1/1607* (2013.01); *H04L 1/1854* (2013.01); *H04L 1/1861* (2013.01); *H04L 12/189* (2013.01); *H04W 72/005* (2013.01); *H04L 2001/0093* (2013.01); *H04W 74/0866* (2013.01)

(58) Field of Classification Search
  CPC ... H04L 1/1854; H04L 1/0026; H04L 1/0029; H04L 2001/0093
  USPC .......... 455/522, 127.1, 422.1, 450–455, 464, 455/509; 370/328–337, 339, 341–348, 370/431–463
  See application file for complete search history.

(56) References Cited

U.S. PATENT DOCUMENTS

| | | | |
|---|---|---|---|
| 7,103,027 B2 | 9/2006 | Dick et al. | |
| 7,212,809 B2 | 5/2007 | Khawand | |
| 7,233,577 B2 | 6/2007 | Choi et al. | |
| 7,302,276 B2 | 11/2007 | Bernhardsson et al. | |
| 7,363,047 B2 | 4/2008 | Yi et al. | |
| 7,372,891 B1* | 5/2008 | Widdowson | H04B 1/68 375/135 |
| 7,664,076 B2 | 2/2010 | Kim et al. | |
| 7,701,844 B2 | 4/2010 | Terry | |
| 7,796,938 B2 | 9/2010 | Nishio et al. | |
| 7,808,951 B2 | 10/2010 | Choi et al. | |
| 7,864,722 B2 | 1/2011 | Yi et al. | |
| 7,898,948 B2 | 3/2011 | DiGriolamo et al. | |
| 8,369,860 B2 | 2/2013 | Zhang et al. | |
| 8,638,707 B2 | 1/2014 | Chun et al. | |
| 8,649,263 B2 | 2/2014 | DiGriolamo et al. | |
| 8,660,027 B2 | 2/2014 | DiGriolamo et al. | |
| 8,705,456 B2 | 4/2014 | Zeira et al. | |
| 2003/0081690 A1 | 5/2003 | Kim et al. | |
| 2003/0119452 A1 | 6/2003 | Kim et al. | |
| 2003/0130476 A1 | 7/2003 | Kemmish et al. | |
| 2004/0151133 A1* | 8/2004 | Yi | H04W 99/00 370/312 |
| 2004/0184471 A1 | 9/2004 | Chuah et al. | |
| 2004/0224698 A1* | 11/2004 | Yi | H04W 76/02 455/450 |
| 2004/0229572 A1 | 11/2004 | Cai et al. | |
| 2004/0229624 A1 | 11/2004 | Cai et al. | |
| 2004/0246988 A1 | 12/2004 | Bruckner et al. | |
| 2005/0201296 A1 | 9/2005 | Vannithamby et al. | |
| 2006/0036922 A1 | 2/2006 | Hong et al. | |
| 2006/0160556 A1 | 7/2006 | Mueller et al. | |
| 2006/0268882 A1 | 11/2006 | Mademann | |
| 2006/0291579 A1 | 12/2006 | Duan et al. | |
| 2007/0071025 A1* | 3/2007 | Bergstrom | H04L 1/1887 370/448 |
| 2007/0167994 A1* | 7/2007 | Shelton | A61N 1/08 607/60 |
| 2007/0174885 A1 | 7/2007 | Hus et al. | |
| 2007/0280177 A1* | 12/2007 | Uusikartano | H04W 8/12 370/338 |
| 2007/0293224 A1 | 12/2007 | Wang et al. | |
| 2008/0045228 A1 | 2/2008 | Zhang et al. | |
| 2008/0095185 A1 | 4/2008 | DiGriolamo et al. | |
| 2008/0123585 A1 | 5/2008 | Granzow et al. | |
| 2008/0165697 A1 | 7/2008 | Zeira et al. | |
| 2009/0046641 A1 | 2/2009 | Wang et al. | |
| 2009/0109912 A1 | 4/2009 | DiGriolamo et al. | |
| 2009/0213800 A1 | 8/2009 | Lee et al. | |
| 2010/0165901 A1* | 7/2010 | Kim | H04W 72/005 370/312 |
| 2011/0149787 A1 | 6/2011 | DiGriolamo et al. | |
| 2012/0201166 A1 | 8/2012 | DiGriolamo et al. | |
| 2013/0195055 A1 | 8/2013 | Zhang et al. | |
| 2014/0169304 A1 | 6/2014 | DiGriolamo et al. | |
| 2014/0177565 A1 | 6/2014 | Zeira et al. | |

FOREIGN PATENT DOCUMENTS

| | | |
|---|---|---|
| EP | 1835663 A2 | 9/2007 |
| JP | 2005-012276 | 1/2005 |
| KR | 2004-0041289 | 5/2004 |
| KR | 2005-0109009 | 11/2005 |
| WO | 2004/042963 | 5/2004 |
| WO | 2005/034397 | 4/2005 |
| WO | 2005/079021 | 8/2005 |
| WO | 2005/109693 | 11/2005 |
| WO | 2006/034818 | 4/2006 |
| WO | 2006/034819 | 4/2006 |

OTHER PUBLICATIONS

Dottling et al., "Incremental Redundancy and Bit-Mapping Techniques for High Speed Downlink Packet Access," IEEE Global Telecommunications Conference, pp. 908-912 (Dec. 2003).

Gidlund et al., "An Improved ARQ Scheme with Application to Multi-Level Modulation Techniques," IEEE International Symposium on Communications and Information Technology, vol. 2, pp. 973-978 (Oct. 2004).

Holma et al., "WCDMA for UMTS: Radio Access for Third Generation Mobile Communications," John Wiley & Sons, Ltd., 3$^{rd}$ edition (2004).

LG Electronics, "MBMS on HSDPA," 3GPP TSG RAN WG2 Meeting #51, R2-060583 (Feb. 13-17, 2006).

NEC, "Use of a Shared HSDPA Channel for MBMS PTP Transmission," 3GPP TSG-RAN2 Meeting #48 R2-052023 (Aug. 29-Sep. 2, 2005).

Philps, "Fetch of Missing Packets for MBMS," 3GPP TSG RAN WG2 Meeting #41, R1-040542 (Feb. 16-20, 2004).

Qualcomm, "MBMS: UTRAN Aspects, Discussion of Requirements Integration of MBMS in UTRAN," 3GPP MBMS Workshop, TD MBMS-000029 (May 6-7, 2002).

Third Generation Partnership Project, "Technical Specification Group Radio Access Network; Physical layer aspects for evolved Universal Terrestrial Radio Access (UTRA) (Release 7)," 3GPP TR25.814 V7.0.0 (Jun. 2006).

Third Generation Partnership Project, Technical Specification Group Radio Access Network; Physical layer aspects for evolved Universal Terrestrial Radio Access (UTRA) (Release 7),: 3GPP TR25.814 V7.1.0 (Sep. 2006).

Third Generation Partnership Project, "Technical Specification Group Radio Access Network; Introduction of the Multimedia Broadcast Multicast Service (MBMS) in the Radio Access Network (RAN); Stage 2 (Release 6)," 3GPP TS 25.346 V6.8.0 (Jun. 2006).

Third Generation Partnership Project, "Technical Specification Group Radio Access Network; Introduction of the Multimedia Broadcast Multicast Service (MBMS) in the Radio Access Network (RAN); Stage 2 (Release 6)," 3GPP TS 25.346 V6.11.0 (Jun. 2007).

Third Generation Partnership Project, "Technical Specification Group Radio Access Network; Spreading and modulation (FDD) (Release 1999)," 3GPP TS 25.213 V3.9.0 (Dec. 2003).

Third Generation Partnership Project, "Technical Specification Group Radio Access Network; Spreading and modulation (FDD) (Release 4)," 3G TS 25.213 V4.4.0 (Dec. 2003).

(56) References Cited

OTHER PUBLICATIONS

Third Generation Partnership Project, "Technical Specification Group Radio Access Network; Spreading and modulation (FDD) (Release 5)," 3GPP TS 25.213 V5.6.0 (Jun. 2005).
Third Generation Partnership Project, "Technical Specification Group Radio Access Network; Spreading and modulation (FDD) (Release 6)," 3GPP TS 25.213 V6.5.0 (Mar. 2006).
Third Generation Partnership Project, "Technical Specification Group Radio Access Network; Spreading and modulation (FDD) (Release 7)", 3GPP TS 25.213 V7.0.0 (Mar. 2006).
Third Generation Partnership Project, "Technical Specification Group Radio Access Network; Spreading and modulation (FDD) (Release 7)," 3GPP TS 25.213 V7.2.0 (May 2007).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.7.0 (Dec. 2005).
Third Generation Partnership Project, "Technical Specification Group Radio Access Network; Physical channels and mapping of transport channels onto physical channels (FDD) (Release 7)," 3GPP TS 25.211 V7.0.0 (Mar. 2006).
Third Generation Partnership Project, "Technical Specification Group Radio Access Network; Physical channels and mapping of transport channels onto physical channels (FDD) (Release 7)," 3GPP TS 25.211 V7.2.0 (May 2007).
Third Generation Partnership Project, "Technical Specification Group Radio Access Network; Physical layer procedures (FDD) (Release 1999)," 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Physical layer procedures (FDD) (Release 6)," 3GPP TS 25.214 V6.9.0 (Jun. 2006).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 7)." 3GPP TS 25.214 V7.1.0, (Jun. 2006).
Third Generation Partnership Project, "Technical Specification Group Radio Access Network; Physical layer procedures (FDD) (Release 7)." 3GPP TS 25.214 V7.5.0, (Jun. 2007).
Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).
Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall description; Stage 2 (Release 6)," 3GPP TS 25.308 V6.4.0 (Mar. 2007).
Third Generation Partnership Project, "Technical Specification Group Radio Access Network; High Speed Downlink Packet Access (HSDPA); Overall description; Stage 2 (Release 7)," 3GPP TS 25.308 V7.0.0 (Mar. 2006).
Third Generation Partnership Project, "Technical Specification Group Radio Access Network; High Speed Downlink Packet Access (HSDPA); Overall description; Stage 2 (Release 7)," 3GPP TS 25.308 V7.3.0 (Jun. 2007).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.17.0 (Mar. 2005).
Third Generation Partnership Project, "Technical Specification Group Radio Access Network; Radio Resource Control (RRC); Protocol Specification (Release 5)," 3GPP TS 25.331 V5.17.0 (Jun. 2006).
Third Generation Partnership Project, "Technical Specification Group Radio Access Network; Radio Resource Control (RRC); Protocol Specification (Release 5)," 3GPP TS 25.331 V5.19.0 (Dec. 2006).
Third Generation Partnership Project, "Technical Specification Group Radio Access Network; Radio Resource Control (RRC); Protocol Specification (Release 6)," 3GPP TS 25.331 V6.10.0 (Jun. 2006).
Third Generation Partnership Project, "Technical Specification Group Radio Access Network; Radio Resource Control (RRC); Protocol Specification (Release 6)," 3GPP TS 25.331 V6.14.0 (Jun. 2007).
Third Generation Partnership Project, "Technical Specification Group Radio Access Network; Radio Resource Control (RRC); Protocol Specification (Release 7)," 3GPP TS 25.331 V7.1.0 (Jun. 2006).
Third Generation Partnership Project, "Technical Specification Group Radio Access Network; Radio Resource Control (RRC); Protocol Specification (Release 7)," 3GPP TS 25.331 V7.5.0 (Jun. 2007).
Third Generation Partnership Project, "Technical Specification Group Radio Access Network; Physical layer procedures (Release 8)," 3GPP TS 36.213 V1.2.0 (May 2007).
Third Generation Partnership Project, "Technical Specification Group Radio Access Network; Evolved Univesal Terrestrial Radio Access (E-UTRA) and Evolved Universal Terrestrial Radio Access Network (E-UTRAN); Overall description; Stage 2 (Release 8)," 3GPP TS 36.300 V8.1.0 (Jun. 2007).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).
Wang et al., "3G Evolved Technology Standardization Process," Section 2.1.2 (Mar. 2006).
Third Generation Partnership Project, "Technical Specification Group Radio Access Network; Physical Channels and Modulation (Release 8)," 3GPP TS 36.211 V1.2.0 (Jun. 2007).
NTT Docomo, "Random Access Channel Structure for E-UTRA Uplink," 3GPP TSG-RAN WG1 and WG2 Joint Meeting, R2-061064, Athens, Greece (Mar. 27-31, 2006).
Philips, "Initial Access Procedures for LTE RACH," 3GPP TSG-RAN WG2 Meeting #53, R2-061256, Shanghai, China (May 8-12, 2006).

\* cited by examiner

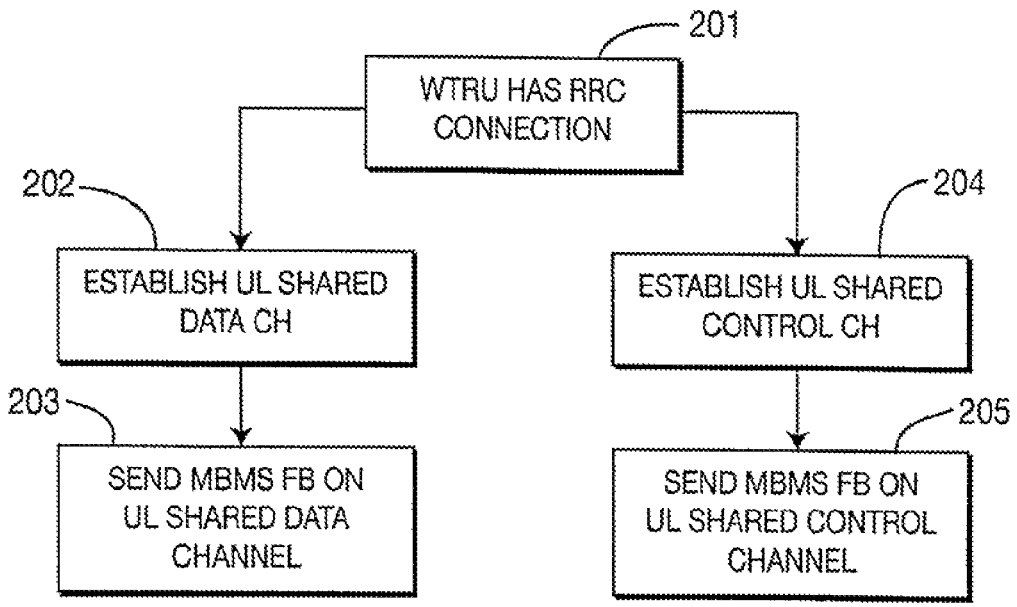
FIG. 2
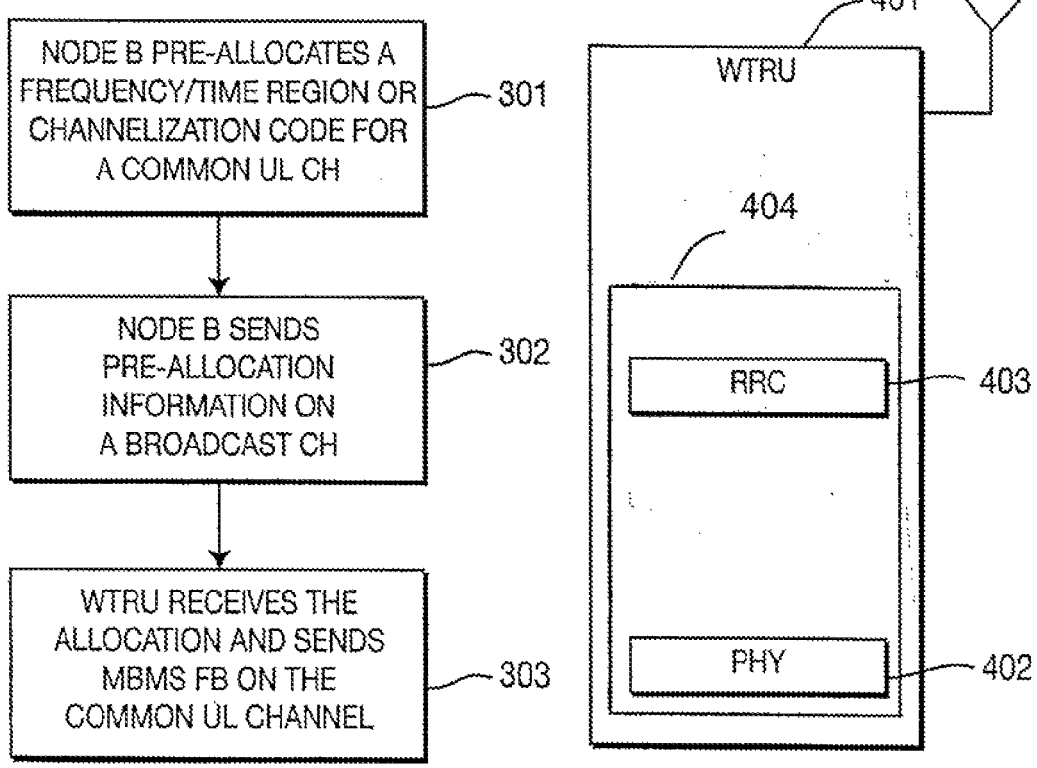
FIG. 3
FIG. 4

SENDING AND REDUCING UPLINK FEEDBACK SIGNALING FOR WIRELESS TRANSMISSION OF DATA

CROSS REFERENCE TO RELATED APPLICATIONS

This application is a continuation of U.S. application Ser. No. 13/758,758 filed on Feb. 4, 2013, which is a continuation of U.S. application Ser. No. 11/840,755, filed on Aug. 17, 2007, which issued as U.S. Pat. No. 8,369,860 on Feb. 5, 2013, which claims the benefit of U.S. provisional application No. 60/838,670 filed on Aug. 18, 2006 and U.S. provisional application No. 60/841,665 filed on Aug. 31, 2006, which are incorporated by reference as if fully set forth.

FIELD OF INVENTION

The present invention is related to a wireless communication system. More particularly, a method, apparatus and system for reducing uplink feedback signaling for transmission of multimedia broadcast multicast service (MBMS) data.

BACKGROUND

In order to keep the technology competitive for a longer period, both third generation partnership project (3GPP) and 3GPP2 are considering long term evolution (LTE), in which evolution of radio interface and network architecture are necessary.

Multimedia broadcast multicast service (MBMS) is a feature that has been introduced in the 3GPP Release 6 specifications to allow the transfer of multimedia information, (e.g., audio, video), through point-to-point (PTP) or point-to-multipoint (PTM) operation. MBMS is supported in Universal Mobile Telecommunications Systems (UMTS) release 6. In order to further improve MBMS as an efficient mechanism to reliably distribute multimedia content over evolved UMTS Terrestrial Radio Access (E-UTRA) networks to subscribers, enhanced MBMS is considered and being worked on in the 3GPP LTE standardization efforts.

In prior art of UMTS Release 6, there is no wireless transmit/receive unit (WTRU) feedback for MBMS to network base stations (called Node Bs in 3GPP). In 3GPP LTE, WTRU feedbacks has been proposed in order to improve MBMS operation in E-UTRA systems. Therefore, WTRU feedback transmission has become an important design problem in E-UTRA systems.

In MBMS, the broadcast service always operates in a PTM mode, whereas the multicast service may operate either in a PTP mode or a PTM mode. For multicast service, a radio access network (RAN) may select either the PTP mode or the PTM mode based on the number of wireless transmit/receive units (WTRUs) that have joined the multicast service within a cell using an MBMS counting procedure.

In the PTP mode, a dedicated channel (DCH) is used to carry the MBMS data to end users. In the PTM mode, data is transferred over an MBMS traffic channel (MTCH), which is mapped to a forward access channel (FACH) and in turn to a secondary common control physical channel (S-CCPCH). The PTM allows for more efficient use of radio resources when many WTRUs subscribe to the same service.

High-Speed Downlink Packet Access (HSDPA) has been introduced in 3GPP Release 5 specifications. One enhancement that has been proposed for MBMS is the transfer of MBMS data, (i.e., MTCH logical channel), over HSDPA. In HSDPA, techniques are used, such as an adaptive modulation and coding (AMC), hybrid automatic repeat request (H-ARQ) for fast feedback and fast Node B scheduling, in order to increase spectral efficiency.

The AMC adapts the transmission date rate on a high speed downlink shared channel (HS-DSCH) according to the channel conditions perceived by the receiving WTRU. The Node B may determine the best rate and scheduling for individual transmissions using the following information:
 1) channel quality information (CQI) reported from the WTRUs, which indicate the quality of the channel that is perceived by the WTRUs;
 2) transmit power control (TPC) commands of associated dedicated channels; and
 3) acknowledgement (ACK)/non-acknowledgement (NACK) feedback for previous transmissions.

Lower data rates are generally used for transmissions to WTRUs perceiving unfavorable channel conditions, (e.g., at cell-edge). Higher data rates are used for transmissions to WTRUs perceiving favorable channel conditions.

For PTM operation, WTRUs subscribed to the multicast service receive the MBMS data over the same radio resources. In the case of MBMS over HSDPA, the WTRUs will decode the same high speed physical downlink shared channel (HS-PDSCH) codes within a given transmission time interval (TTI), (i.e., the same HS-DSCH transport block).

One challenge for the Node B is the selection of a modulation and coding scheme for transmission of the multicast transport blocks such that all WTRUs can reliably decode the data without wasting cell capacity. On one hand, the Node B may always transmit using a low data rate to ensure that all WTRUs in the cell, including those with unfavorable channel conditions, can reliably decode the data. On the other hand, the Node B may transmit at a higher data rate in order to avoid wasting HSDPA resources. In this case, WTRUs perceiving unfavorable channel conditions might have trouble decoding the multicast transport blocks.

One way of determining the best transmission rate for MBMS data is to configure WTRUs to report CQI in the uplink (UL), (i.e., CQI over a high speed dedicated physical control channel (HS-DPCCH)). The Node B may set its transmission rate according to the worst CQI report to ensure that all WTRUs can reliably decode the data. However, as the number of WTRUs subscribed to the multicast service increases, the transmission of CQI feedback information causes a significant noise rise in the uplink, reducing the capacity available for other uplink transmissions. Current 3GPP Release 6 specifications do not provide support for optimal transmission rate selection and scheduling of multicast transport blocks over HS-DSCH.

SUMMARY

A method, apparatus and system for WTRU uplink feedback signaling for transmission of MBMS in a wireless communication system such as an E-UTRA system, an HSDPA system, or any internet protocol (IP) based system. Feedback is preferably directly carried by a synchronized or a non-synchronized random access channel (RACH), whereby no uplink shared channel is scheduled by a Node B for a WTRU. In one embodiment, a WTRU uses an allocated uplink shared data/control channel to send the feedback, in response to a request for an uplink shared channel allocation sent by the WTRU on a synchronized or a non-synchronized RACH.

In another embodiment, uplink feedback signaling is reduced for transmission of MBMS data over an E-UTRA or HSDPA channel. A triggering criterion for reporting channel quality indicator (CQI) is set and WTRUs send CQI to a Node B only if the triggering criterion is satisfied. The triggering criterion may be a current operating CQI value at the Node B, whereby the WTRU transmits the CQI when channel conditions are not better than the current operating CQI value. The triggering criterion may be generated based on erroneous high speed downlink shared channel (HS-DSCH) transport blocks reception statistics. The triggering criterion may be a predetermined time period, whereby the WTRU transmits the CQI to the Node B if the WTRU has not sent a CQI for the predetermined time period. A random back-off procedure may be further implemented before sending the CQI.

Another method for feedback reduction includes a Node B sending a multicast data for a predetermined number of times, whereby the WTRU does not have to send an acknowledgement for the multicast data to the Node B. Instead, the WTRU sends an indication of at least one of an average number of transmissions needed to successfully decode the data and an error rate.

Other objects and advantages will be apparent to those of ordinary skill in the art based upon the following description of presently preferred embodiments of the invention.

BRIEF DESCRIPTION OF THE DRAWINGS

FIG. 2 is a flow diagram of a method for uplink feedback signaling related to MBMS transmission sent concurrently with uplink data or control information.

FIG. 3 is a flow diagram of a method in which uplink channel pre-allocation is provided to a WTRU for feedback signaling related to MBMS transmissions.

FIG. 4 is a block diagram of a WTRU configured for uplink feedback related to MBMS transmissions.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node B" includes but is not limited to a base station, a site controller, an access point or any other type of interfacing device in a wireless environment.

An apparatus and method for providing a radio access network (RAN) with the information required to determine an optimal transmission rate and scheduling for multimedia broadcast/multicast service (MBMS) data, without creating excessive noise rise in the uplink is described herein. In addition, an apparatus and method for reducing the signaling overhead due to channel quality indicator (CQI) feedback and Acknowledged/Not Acknowledged (ACK/NACK) feedback for hybrid automatic repeat request (H-ARQ) operation is also set forth.

The WTRU's feedback transmission for MBMS services may be implemented in mixed Unicast and MBMS cells. It is also applicable in the dedicated MBMS cell only if there is no uplink channel.

In order to facilitate MBMS operation, WTRU feedback can be used for MBMS services and includes, but is not limited to, NACK, channel quality indicator (CQI), and response to network counting/polling. In a WTRU NACK feedback used to support point-to-point (PTP) retransmission of MBMS, the WTRU ID is included in the NACK message either explicitly or implicitly. In a WTRU NACK feedback used to support point-to-point (PTM) retransmission of MBMS, the WTRU ID does not need to be carried. For a WTRU CQI feedback used to support MCS adaptation for PTM, the WTRU ID does not need to be included. If the network is performing simultaneous counting/polling for several MBMS services at the same time, a MBMS service ID should be included in the response to the network counting/polling.

In a one embodiment, information of allocated uplink channel for the WTRU's feedback transmission is preferably transmitted on a broadcast channel (BCH). Alternatively, if the WTRU is configured for MBMS, the WTRU's transmission feedback is transmitted on a MBMS Control Channel (MCCH).

Figure 1:
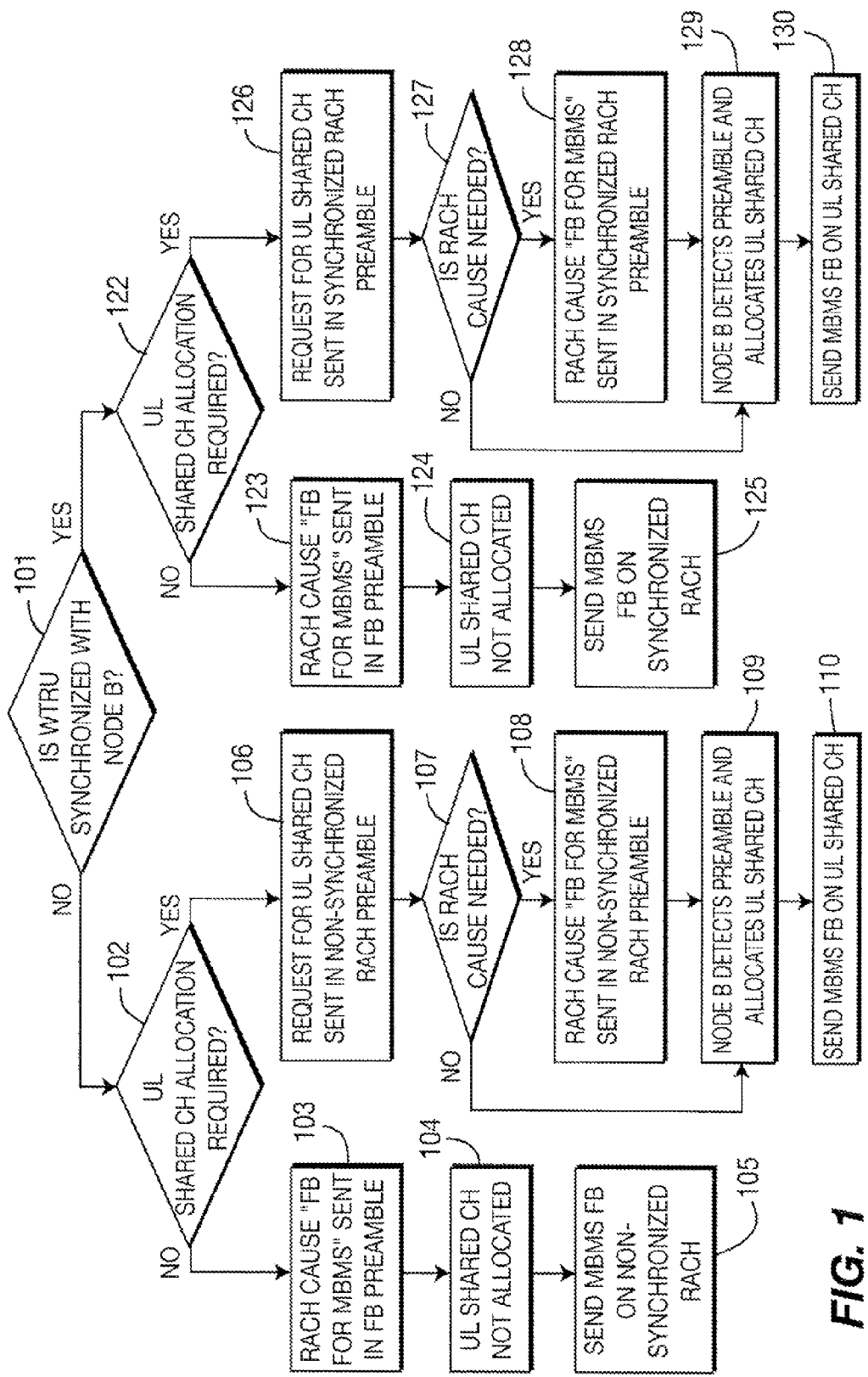
FIG. 1 is a flow diagram of a method for uplink feedback signaling related to MBMS transmission.

FIG. 1 shows a method flowchart for the WTRU's feedback transmission for MBMS. In step 101, the WTRU determines whether it is synchronized with the Node B. If not synchronized, then a non-synchronized RACH is used for the MBMS feedback according to the following procedure. As an example for LTE, this procedure may be used when the WTRU is in LTE_Idle state (i.e., with no RRC connection), or when the WTRU is in LTE_Active state (i.e., with an RRC connection present). Next, if an uplink shared channel allocation is not required by the system configuration in step 102, the WTRU sends a message on the RACH in step 103, preferably within a RACH preamble, that indicates the cause of random access to be "feedback for MBMS". A small number of preambles can be reserved for the cause of "feedback for MBMS". In response to this indication, the Node B will not allocate an uplink shared channel to the WTRU for MBMS feedback (step 104) and the WTRU sends MBMS feedback directly on the non-synchronized RACH (step 105), preferably in the RACH preamble.

Returning to step 102, if an uplink shared channel allocation is required by the system configuration, the WTRU sends a request for such an allocation as an indication in the non-synchronized RACH preamble (step 106). If a RACH cause is required, the amount of feedback can be carried using the current design of non-synchronized random access channel, and the basic non-synchronized random access channel structure does not need to be changed to carry feedback for MBMS.

Alternatively, the channel structure is modified for non-synchronized random access channel carrying feedback for MBMS, including the following examples. The preamble of non-synchronized random access channel can be extended longer to carry more implicit information. More sequence indices can be used for the preamble sequence (e.g., a Zadoff-Chu or GCL sequence) of the non-synchronized random access channel to carry more implicit information. The non-synchronized random access channel can carry the MBMS feedback information explicitly. The random access burst can be extended longer to add a message/control bits field.

If a RACH cause indication is required (step 107), the WTRU sends a "Feedback for MBMS" indication, preferably in a non-synchronized RACH preamble (step 108). A certain number of preambles can be reserved for the feedback information together with the "Feedback for MBMS" indication. The advantage of requiring the cause for RACH indication is that the Node B would not otherwise recognize that the RACH burst is for feedback of MBMS, and would treat the information carried on the RACH as regular RACH access information. One solution is to configure the Node B to perform blind detection, but there is a tradeoff of degraded performance and increased complexity.

If the RACH cause indication is not required, then step 108 is skipped. Regardless of whether the RACH cause indication is sent, the Node B detects the RACH preamble and allocates an uplink shared channel (step 109). In step 110, the WTRU sends its MBMS feedback on the uplink shared data/control channel according to its granted allocation. The allocated uplink shared data/control channel should be large enough to allow the WTRU to transmit feedback for MBMS within a predetermined time period.

Returning to step 101, if the WTRU is synchronized with the Node B, then the WTRU uses a synchronized RACH according to the following procedure, which for the case of LTE as an example, can be used when WTRU is in LTE_Active state (with RRC connection).

In step 122, if an uplink shared channel allocation is not required by the system configuration, the WTRU sends a message on the RACH in step 123, preferably within a RACH preamble, that indicates the cause of random access to be "feedback for MBMS". A small number of preambles can be reserved for the cause of "feedback for MBMS". In response to this indication, the Node B will not allocate an uplink shared channel to the WTRU for MBMS feedback (step 124) and the WTRU sends MBMS feedback directly on the synchronized RACH (step 125), preferably in the RACH preamble.

While a regular RACH preamble is used by the WTRU to transmit a scheduling request on a shared channel, in accordance with this embodiment, the WTRU will either use the regular RACH preamble if adequately sized, or an extended preamble to include the RACH cause indication or explicit control bit(s). The synchronized RACH structure has a modified preamble sequence and control bit field mapping for indication of "Feedback for MBMS". Moreover, the new channel structure or the reserved preambles allow the Node B to identify that it is not a regular synchronized random access channel carrying merely a scheduling request from the WTRUs. Hence, Node B will not schedule uplink shared channel for the WTRU.

If the amount of feedback can be carried using the current design of synchronized random access channel (such as the 24 bit length currently specified), the basic synchronized RACH structure does not need to be changed. Otherwise, a different channel structure will be used for synchronized random access channel carrying feedback for MBMS. The modifications to the RACH include, but are not limited to, the following examples:
  the preamble of synchronized random access channel can be extended longer to carry more implicit information;
  more sequence indices can be used for the preamble sequence of synchronized random access channel to carry more implicit information; and
  the synchronized random access channel carries more explicit information bits—a random access burst may be extended longer to carry more bits in order to do so.

Returning to step 122, if an uplink shared channel allocation is required by the system configuration, the WTRU sends a request for such an allocation as an indication in the synchronized RACH preamble (step 126).

If a RACH cause indication is required (step 127), the WTRU sends a "Feedback for MBMS" indication, preferably in a non-synchronized RACH preamble (step 128). Certain number of preambles can be reserved for the feedback information together with the RACH cause indication of "Feedback for MBMS".

If a RACH cause indication is not required, then step 128 is skipped. Regardless of whether the RACH cause indication is sent, the Node B detects the RACH preamble and allocates an uplink shared channel (step 129). In step 130, the WTRU sends its MBMS feedback on the uplink shared data/control channel according to its granted allocation. The allocated uplink shared data/control channel should be large enough to allow the WTRU to transmit feedback for MBMS within a predetermined time period.

FIG. 2 is a flow chart of a method in which the WTRU transmit feedback information for MBMS services exists on a concurrent uplink shared channel. For LTE application, this method is applied when WTRU is in LTE_Active state (with RRC connection) and has uplink shared channel in the current TTI. In step 201, the WTRU establishes an RRC connection. In step 202, an uplink shared data channel is established. When the WTRU has MBMS feedback, it is transmitted together with uplink data and data-associated control information on the uplink shared data channel in step 203. As a separate process, or in combination with the previous steps, the WTRU establishes an uplink non-data-associated shared control channel (such as CQICH, ACKCH) in step 204. The WTRU's MBMS feedback is transmitted together with uplink non-data-associated control information on the uplink shared control channel in step 205.

FIG. 3 is a flow chart of a method in which the Node B pre-allocates a channel region for the MBMS feedback purpose. In one variation, the pre-allocation is configured for one type of feedback, for example, only a NACK. In an alternative variation, multiple channel regions are pre-allocated, each with its own type of MBMS feedback. For an LTE system, or any OFDMA-based system or any single carrier FDMA (SC-FDMA) type system, a time-frequency region (e.g., a block or a symbol) is pre-allocated by the Node B (step 301). For a WCDMA type system, the Node B pre-allocates a common channelization code for the uplink MBMS feedback indication. In step 302, the Node B sends a pre-allocation indication on a broadcast channel to the WTRUs. In step 303, for each WTRU, if the MBMS feedback criterion is met, the WTRU transmits some pre-defined burst in the pre-allocated time-frequency region or common channelization code for the MBMS feedback. The feedback may comprise an indicator (e.g., a NACK message) or a few bits. The Node B detects whether there is any feedback by detecting if the received signal power in the time-frequency region (or if the common channelization code) exceeds a pre-defined threshold. A processor within the Node B may be used to implement the above Node B method steps; a processor in the WTRU may by used to implement the above WTRU steps.

FIG. 4 shows a WTRU 401 which implements the above MBMS feedback methods. WTRU 401 comprises a physical layer (PHY) entity 402 and a radio resource control (RRC) entity 403, implemented as a single processor 404. Alternatively, separate processors may be used to implement these entities. The PHY entity 402 is responsible for generating the MBMS feedback message (e.g., CQI or NACK). The RRC entity 403 monitors its connection status and for LTE, determines whether the current mode is LTE_Active state or LTE_Idle state. The synchronized or non-synchronized RACH is selected for transmitting the MBMS feedback by the RRC entity 403 based on its connection status.

Since the number of WTRUs subscribing to MBMS can be large, traffic control of feedback on the uplink is a desirable feature. A preferred embodiment of the present invention includes a probability-based feedback reduction mechanism for MBMS, such as reducing the number of CQI and NACK messages sent by the WTRUs. The network (i.e., the Node B or access gateway) configures a response/feedback probability parameter for a particular type of MBMS feedback. By way of example, the network determines that an estimated 0.3 probability for a CQI MBMS feedback will prevent an overload by the MBMS feedback and keep the uplink traffic to an acceptable level. Hence, the threshold parameter for CQI feedback is 0.3. The WTRU is notified of the parameter by the network via a control channel or a broadcast channel. The WTRU draws a random number when it wants to send MBMS feedback. If the random number is below the response/feedback probability parameter, then the WTRU transmits the feedback for MBMS. Otherwise, it will not transmit the feedback. The network can configure different response/feedback probability parameters for different types of feedbacks. Additional reduction of MBMS feedback traffic can be achieved by configuring a lower probability threshold parameter for feedback that uses a large number of bits on the uplink channel than one that uses a low number of bits for feedback.

For HSDPA transmissions, the Node B requires CQI feedback from WTRUs in order to optimally select a transmission rate and schedule multicast data over an HS-DSCH. When channel conditions are worse than, or equal to, the current operating CQI value that is assumed at the Node B, the WTRU transmits a CQI. The current operating CQI value corresponds to the worst CQI amongst subscribed WTRUs, known at the Node B. Once the Node B is informed of a CQI worse than the current operating CQI value by any WTRU, the Node B updates the current operating CQI value. In order to minimize this type of MBMS feedback, a CQI report triggering criterion is established and CQI reports are sent only if the triggering criterion has been met. This differs from the conventional HSDPA control signaling where CQI reports are continuously or periodically generated by WTRUs.

Figure 5:
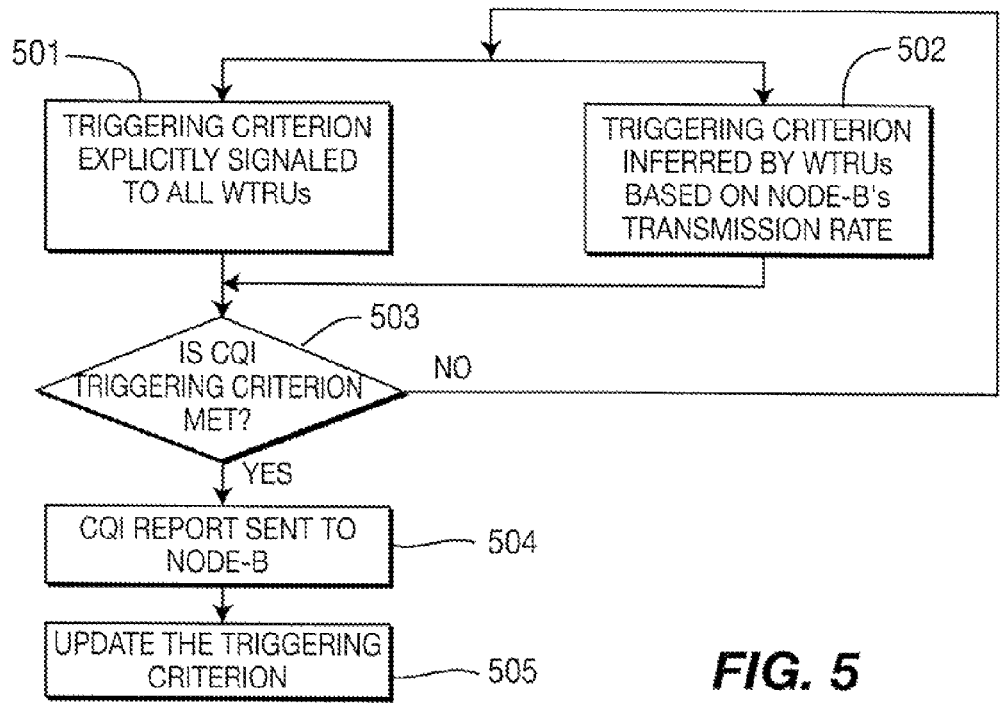
FIG. 5 is a flow diagram of a method for reducing CQI feedback for MBMS transmissions.

FIG. 5 is a method flow chart for reduction of CQI feedback according to this embodiment. The triggering criterion, such as the current operating CQI value, must be known to all subscribed WTRUs so that transmission of the CQI may be triggered if needed. The triggering criterion may be explicitly signaled by the Node B to the WTRUs (step 501) using a high speed shared control channel (HS-SCCH). Additional bits may be added to the conventional HS-SCCH slot format to indicate the triggering criterion. The additional bits may be added per multicast service mapped to the HS-DSCH, or may be combined for all multicast services. The triggering criterion may be transmitted via a HSDPA medium access control (MAC-hs) header modified to include the triggering criterion, via an MBMS control channel (MCCH), or via a new physical layer signal or L2 control channel in the downlink that carries control information related to multicast/broadcast services in the cell.

Alternatively, the WTRU may infer the triggering criterion for the multicast service based on the transmission rate that is used by the Node B, as shown in step 502. A look-up table may be used to map the transmission rate to the triggering criterion. This alternative has an advantage of requiring less signaling in the downlink, but forces the Node B to transmit at a rate corresponding to the current triggering criterion. This removes the flexibility that the Node B might have in further optimizing the transmission rate in case a certain failure level is desired.

In step 503, the triggering criterion is monitored, such as whether the WTRU's CQI is equal to or less than the current operating CQI value. Another possible triggering criterion for uplink CQI reporting is based on reception of erroneous HS-DSCH transport blocks. For this criterion, the transmission of a CQI is triggered upon reception of N consecutive failed HS-DSCH transport blocks. Alternatively, the WTRU may transmit the CQI upon failed reception of N out M previous transport blocks. The values of parameters N and M are configurable by the RAN, and may be signaled to the WTRU once the WTRU subscribes to the multicast service. Alternatively, the triggering criterion is timer based as follows. The WTRU may transmit the CQI to the Node B if the WTRU has not sent a CQI for a predetermined period of time, (e.g., in the last T seconds). The time period, (i.e., the value of parameter T) is configurable by the RAN. The RAN may adjust the time period, (i.e., the value of T), during the multicast service. For example, the RAN may increase the value of T as more users are added to the multicast service to further reduce the uplink overhead.

In step 504, the CQI feedback report is sent by the WTRU once the triggering criterion is met. The triggering criterion is periodically updated as necessary (step 505). For example, if the current operating CQI is the triggering criterion, the Node B will update the current operating CQI to correspond to the worst case value among the CQI reports transmitted by the WTRUs.

In order to avoid sudden simultaneous transmission of the CQI by multiple WTRUs, a random back-off period or persistence may be applied to the triggering criterion. The triggering criterion must persist for a random duration, (e.g. uniformly distributed between 1 to 10 TTIs in TTI intervals), for a WTRU to transmit the CQI in the uplink. Parameters related to the random back-off time are configurable by the RAN. Moreover, the RAN may update the back-off time parameters. For example, the RAN may increase the random back-off time interval as the number of WTRUs that are subscribed to the multicast service increases. The random back-off may be applied to any of the foregoing three embodiments.

In order to determine the initial current operating CQI value or the MBMS transmission rate, the RAN may execute a round robin polling of the WTRUs to respond with a CQI. The worst CQI reported in this procedure becomes the initial current operating CQI value. The round robin polling of WTRUs to obtain CQIs may be a procedure that could be used on its own under the control of the RAN. The periodicity of the polling is a parameter determined by the RAN. The RAN may also execute a random poll of the WTRUs to update the current operating CQI value or determine the MBMS transmission rate.

The polling signal may be signaled by the RAN/Node B in the following ways by adding polling signal bits (including WTRU identification if it does not already exist in the main signal format) to:
1) the existing HS-SCCH slot format;
2) the MAC-hs header format;

3) the MCCH; or 4) new L1 physical signal or L2 control channel in the downlink that carries control information related to multicast services in the cell.

Transmission of the CQI by the WTRUs may be performed by the following mechanisms, (either exclusively or in combination):

1) using the existing HS-DPCCH uplink control channel;
2) over a random access channel (RACH));
3) using a new L1 physical signal or L2 control channel used to convey the CQI. In the L1 physical signal case, a predetermined bit sequence may be used to indicate a step up or step down CQI with respect to the current operating CQI value of the Node B. In either case, the CQI report may be relative to the current operating CQI value, (i.e., step down or step up), or an absolute value.

Figure 6:
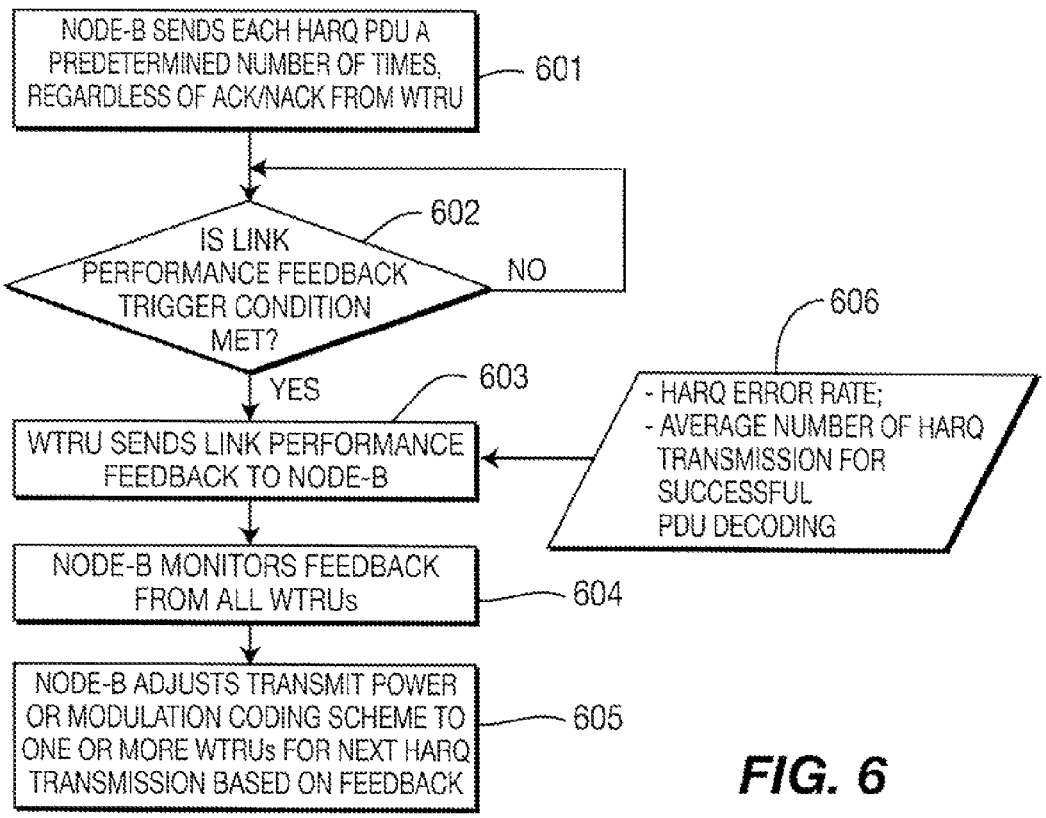
FIG. 6 is a flow diagram of a method for reducing ACK/NACK feedback related to MBMS transmissions.

FIG. 6 is a method flow chart of a method for reduction of another form of feedback signal that a WTRU normally sends during H-ARQ operation, which is the ACK or NACK feedback. The ACK/NACK packets indicate to the Node B whether or not the packet has been successfully decoded.

In step 601, the Node B sends each MAC-hs packet data unit (PDU) a pre-determined number of times. The Node B does not need to decide when to send a new MAC-hs PDU based on the ACK/NACK feedback. However, a mechanism is still desirable for the Node B to be aware of the general performance of the different links. In order to provide the required feedback, the following steps define a new signaling format and procedure that is more efficient than transmitting an ACK or NAK after every single transmission from the Node B.

In step 602, the WTRU continuously monitors whether a trigger condition is satisfied such that an ACK/NACK signal is required to be sent for MBMS feedback. Once the trigger condition is satisfied, then in step 603, the WTRU signals to the Node B a message containing link performance information, such as an indication of the average number of H-ARQ transmissions needed to successfully decode a PDU, or alternatively, the error rate. The link performance data is determined by the WTRU and may be stored temporarily and accessed when needed (step 606). Transmission of the indication may be triggered only if it is different from the previously transmitted indication, or if some other triggering condition is met. Alternatively, this indication may be transmitted at a relatively high interval, (such as after every 8 or 16 complete MAC-hs PDU transfers). The number of bits required to carry this information may be as low as two (or even a single bit). An exemplary mapping is shown in Table 1.

TABLE 1

| Bit sequence | Signification |
|---|---|
| 00 | H-ARQ error rate between 0% and 25% |
| 01 | H-ARQ error rate between 25% and 50% |
| 10 | H-ARQ error rate between 50% and 75% |
| 11 | H-ARQ error rate between 75% and 100% |

It should be understood that the values shown above are only exemplary and any other values are possible. In particular, it is possible to set a rule that triggering criteria for feedback (step 602) by the WTRU suspends any report if the H-ARQ error rate (or average required number of transmissions), is below a certain threshold, (e.g., 25%). In this case, there is no need to map a bit sequence to an H-ARQ error rate below 25% and the range of values to map is reduced, (i.e., 25% to 100% instead of 0% to 100%). The exact mapping between the bit sequence and the H-ARQ error rate (or average required number of transmissions), is preferably pre-determined by specification, or alternatively signaled by higher layers.

The bit sequence for the indication may be suitably encoded to improve reception reliability and match the minimum bit rate of the physical channel carrying it. It is also possible to include the information into a higher layer message if the desired frequency of feedback is low enough.

The Node B monitors the MBMS feedback from all of the WTRUs (step 604). In response to the feedback, the Node B is able to suitably adjust the MCS and/or transmission power at step 605 for the WTRU population listening to the MBMS channel. For example, upon reception of feedback indicating high H-ARQ error rate from one or several WTRUs, the Node B may decide to use a less aggressive MCS scheme or to increase the transmission power. Conversely, if the Node B is signaled low error rates from most or all WTRUs, the Node B may use a more aggressive MCS scheme and/or reduce the transmission power, thus freeing up resources for other applications. The mechanism may be used in conjunction with the CQI reporting scheme defined in the previous embodiments or even replace them altogether.

While the embodiments related to FIGS. 5 and 6 are described in terms of an HSDPA channel, the methods are also applicable to MBMS transmissions and feedback on an E-UTRA based system.

Although the features and elements are described in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a wireless transmit/receive unit (WTRU), the method comprising:
receiving, on a multimedia broadcast multicast service (MBMS) control channel (MCCH), a request for MBMS feedback, wherein the request includes an indication per MBMS service;
sending a preamble in a random access channel (RACH), the sent preamble indicating a request for an uplink shared channel allocation;
receiving the uplink shared channel allocation; and
sending the MBMS feedback on the uplink shared channel.

2. The method as in claim 1, wherein the preamble is derived from a Zadoff-Chu sequence.

3. The method as in claim 1, wherein the WTRU is in an LTE_Active state and the RACH is a synchronized.

4. The method as in claim 1, wherein the WTRU is in an LTE_Active state or an LTE_Idle state and the RACH is non-synchronized.

5. A wireless transmit/receive unit (WTRU) in a wireless communication system that supports multimedia broadcast multicast service (MBMS), the WTRU comprising:
a transceiver operatively coupled to a processor;
the transceiver configured to receive, on an MBMS control channel (MCCH), a request for MBMS feedback, wherein the request includes an indication per MBMS service;
the transceiver configured to send a preamble in a random access channel (RACH), wherein the sent preamble indicates a request for an uplink shared channel allocation;
the transceiver is further configured to receive the uplink shared channel allocation; and
the transceiver is further configured to send the MBMS feedback on the uplink shared channel.

6. The WTRU of claim 5, wherein the preamble is derived from a Zadoff-Chu sequence.

7. The WTRU as in claim 5, wherein the WTRU is in an LTE_Active state and the RACH is synchronized.

8. The WTRU of claim 5, wherein the WTRU is in an LTE_Active state or an LTE_Idle state and the RACH is non-synchronized.

9. The method of claim 1, wherein the MBMS feedback is for counting.

10. The method of claim 1, wherein the request for MBMS feedback includes a request for MBMS feedback on a first MBMS service and is received by a plurality of WTRUs, wherein only a subset of the plurality of WTRUs respond to the request for MBMS feedback on the first MBMS service.

11. The method of claim 1, wherein non-MBMS feedback information is sent with the MBMS feedback information sent on the uplink shared channel.

12. The WTRU of claim 5, wherein the MBMS feedback is for counting.

13. The WTRU of claim 5, wherein the request for MBMS feedback includes a request for MBMS feedback on a first MBMS service and is received by a plurality of WTRUs, wherein only a subset of the plurality of WTRUs respond to the request for MBMS feedback on the first MBMS service.

14. The WTRU of claim 5, wherein the transceiver is configured to send non-MBMS feedback information with the MBMS feedback information sent on the uplink shared channel.

* * * * *